(12) United States Patent
Aumann et al.

(10) Patent No.: US 10,735,293 B2
(45) Date of Patent: Aug. 4, 2020

(54) METHOD AND NETWORK MONITORING DEVICE FOR ESTIMATING WEB PAGE DOWNLOAD TIME ON A USER DEVICE

(71) Applicant: Cellos Software Ltd, Melbourne, VIC (AU)

(72) Inventors: Greg Aumann, Mitcham (AU); Amit Goel, Gurgaon Haryana (IN)

(73) Assignee: CELLOS SOFTWARE LTD, Melbourne (AU)

( * ) Notice: Subject to any disclaimer, the term of this patent is extended or adjusted under 35 U.S.C. 154(b) by 116 days.

(21) Appl. No.: 14/952,239

(22) Filed: Nov. 25, 2015

(65) Prior Publication Data
US 2016/0156537 A1 Jun. 2, 2016

(30) Foreign Application Priority Data
Nov. 27, 2014 (IN) .......................... 3459/DEL/2014

(51) Int. Cl.
*H04L 12/26* (2006.01)
*H04L 29/08* (2006.01)

(52) U.S. Cl.
CPC .......... *H04L 43/0888* (2013.01); *H04L 43/04* (2013.01); *H04L 43/062* (2013.01); *H04L 43/12* (2013.01); *H04L 67/02* (2013.01); *H04L 43/16* (2013.01)

(58) Field of Classification Search
CPC ... H04L 43/0888; H04L 43/04; H04L 43/062; H04L 43/12; H04L 67/02; H04L 43/16
USPC ........................................................ 709/224
See application file for complete search history.

(56) References Cited

U.S. PATENT DOCUMENTS

| | | | |
|---|---|---|---|
| 9,253,233 B2* | 2/2016 | Luby | H04N 21/23439 |
| 2003/0221000 A1 | 11/2003 | Cherkasova et al. | |
| 2007/0124499 A1* | 5/2007 | Bedingfield, Sr. | H04L 29/12594 709/245 |
| 2007/0201502 A1* | 8/2007 | Abramson | H04L 67/32 370/429 |
| 2008/0049775 A1* | 2/2008 | Morrill | H04L 41/147 370/419 |
| 2010/0039957 A1* | 2/2010 | Kotrla | H04L 41/5009 370/253 |
| 2011/0167156 A1* | 7/2011 | Mani | H04L 67/02 709/224 |
| 2012/0124372 A1* | 5/2012 | Dilley | H04L 67/2819 713/162 |
| 2013/0163438 A1* | 6/2013 | Wilkinson | H04L 43/50 370/242 |
| 2013/0166738 A1* | 6/2013 | Ivershen | H04L 43/08 709/224 |
| 2013/0336136 A1* | 12/2013 | Meylan | H04L 43/08 370/252 |
| 2014/0269269 A1* | 9/2014 | Kovvali | H04W 24/08 370/229 |

FOREIGN PATENT DOCUMENTS

EP 2605480 6/2013

* cited by examiner

*Primary Examiner* — Umar Cheema
*Assistant Examiner* — Tony Williams
(74) *Attorney, Agent, or Firm* — Shumaker, Loop & Kendrick, LLP

(57) ABSTRACT

The present disclosure relates to a method for estimating a web page download time on a web browser in a user device from a corresponding web server and to a network monitoring device for performing the method.

10 Claims, 14 Drawing Sheets

| Active Second Vector of Traffic Flow 1 | 0000000000110110110000 |
| Active Second Vector of Traffic Flow 2 | 0000000000110110101000000 |
| Active Second Vector of Traffic Flow 3 | 0000000010111011100000000 |
| Active Second Vector of Traffic Flow 4 | 0000001101101100000000 |
| Active Second Vector of Traffic Flow 5 | 0000011010100100000000 |
| Aggregated Active Second Vector | 0000011111111110000 |

Figure 9

METHOD AND NETWORK MONITORING DEVICE FOR ESTIMATING WEB PAGE DOWNLOAD TIME ON A USER DEVICE

FIELD

The present invention relates to methods and a network monitoring device for estimating time elapsed between a user's selection on a hyperlink or a universal resource locator input in a web browser of a user device and complete web page download.

BACKGROUND

Web page download time can be used as a key performance indicator of end user/subscriber experience and satisfaction in a data network or a wireless communication network. Conventionally, web page download time may be measured or estimated by software embedded in a web browser of a user device, such as for example a wireless communication device or a computing device on which end users access web pages. The software may then transmit the estimated web page download time back to the data network operator. However, this technique requires software adapted for all types of mobile devices, computing devices and browsers.

Non-intrusive or passive monitoring of data networks has been proposed as a means for estimating web page download time of end user/subscriber. However, due to the large number of computing devices and wireless communication devices continuously accessing the Internet, coupled with the fact that IP packets corresponding to each subscriber may not travel along the same route, determination of web page download time of each web session of each user device is difficult. In addition, each user device may have multiple web sessions with different web servers, and each multiple web session (belonging to/classified to the same domain) may include multiple traffic flows which may include a web server re-directed by a managing web server after receiving a request message from the user device. As such, it is difficult to monitor respectively the user-perspective web page/home page download time on computing devices and wireless communication devices.

Against this background there is a need for a method, a network monitoring device or a system that can efficiently and more accurately estimate web page/home page download time on a user device from the selection of a hyperlink or Universal Resource Identifier (URI) input in a web browser to complete web page download on the user device.

SUMMARY

According to an exemplary embodiment of the present disclosure, there is provided a method for estimating a web page download time on a web browser in a user device from a corresponding web server, comprising:

receiving a plurality of active traffic flows by a network monitoring device;

generating, by the network monitoring device, active traffic reports corresponding to the active traffic flows of the user device;

grouping, by the network monitoring device, domains corresponding to the active traffic flows according to a configured domain grouping file;

aggregating, by the network monitoring device, active second vectors in the active traffic reports according to the grouped domains, and generating at least one aggregated active second vector for the user device;

detecting, by the network monitoring device, at least one burst in the at least one aggregated active second vector; and estimating, by the network monitoring device, a web page download time of the user device according to the detected burst in the at least one aggregated active second vector.

The method may further comprise determining, by the network monitoring device, whether a number of active seconds of a potential burst in one of the at least one aggregated active second vectors is greater than or equal to a configured active second lower threshold.

When it is determined that the number of active seconds of a potential burst is greater than or equal to the configured active second lower threshold, the method may further comprise determining, by the network monitoring device, whether a consecutive number of idle seconds before the start of the potential burst is greater than or equal to a configured preceding idle second threshold.

When it is determined that the consecutive number of idle seconds before the start of a potential burst is greater than or equal to the configured preceding idle second threshold the method may further comprise determining, by the network monitoring device, whether a consecutive number of idle seconds after the end of the potential burst is greater than or equal to a configured succeeding idle second threshold.

When it is determined that the consecutive number of idle seconds after the end of the potential burst is greater than or equal to the configured succeeding idle second threshold the method may further comprise determining, by the network monitoring device, whether the potential burst contains a Hypertext Transfer Protocol GET Request message.

When it is determined that the potential burst contains a Hypertext Transfer Protocol GET Request message the method may further comprise determining, by the network monitoring device, the potential burst to be a burst for estimating the web page download time.

After estimating the web page download time, the method may further comprise outputting, by the network monitoring device, the estimated web page download time of the user device to an external processing device.

Before estimating the web page download time, the method may further comprise detecting, by the network monitoring device, a home page in the burst for estimating the web page download time, according to a configured list of home pages.

After detecting a home page in the burst for estimating the web page download time, the method may further comprise estimating, by the network monitoring device, a home page download time.

After estimating a web page download time, the method may further comprise outputting, by the network monitoring device the estimated home page download time to an external processing device.

According to an exemplary embodiment of the present disclosure, there is provided a network monitoring device for estimating a web page download time on a web browser in a user device from a corresponding web server in a network, comprising:

at least one network interface connected to the network and configured to receive a plurality of active traffic flows, a link processor connected to the at least one network interface configured to generate active traffic reports corresponding to the active traffic flows of the user device;

a correlation processor connected to the link processor and configured to:

group domains corresponding to the active traffic flows according to a configured domain grouping file;

aggregate active second vectors in the active traffic reports according to the grouped domains, and generate at least one aggregated active second vector for the user device;

detect at least one burst in the at least one aggregated active second vector; and estimate a web page download time of the user device according to the detected burst in the at least one aggregated active second vector.

The correlation processor may further be configured to output the estimated web page download time.

BRIEF DESCRIPTION OF DRAWINGS

Embodiments of the invention will now be described by way of example only with reference to the accompanying drawings, in which:

FIG. 9 illustrates the correlation processor aggregating all active second vectors of active traffic flows corresponding to the same domain of a web session corresponding to a user device;

DETAILED DESCRIPTIONS OF EXEMPLARY EMBODIMENTS

Figure 1:
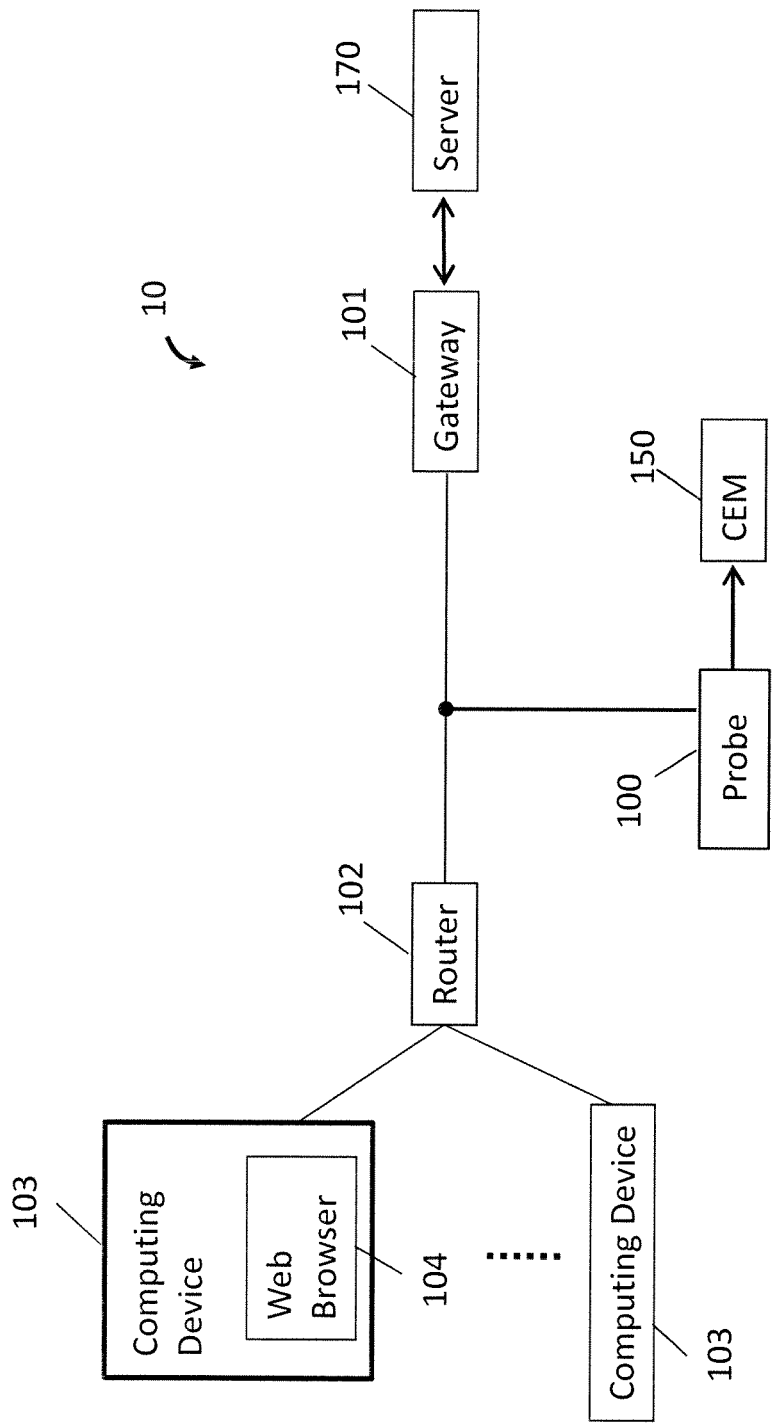
FIG. 1 illustrates architecture of an exemplary data network 10 according to an embodiment of the present invention.

In the following description, numerous specific details are set forth in order to provide a thorough understanding of various illustrative embodiments of the invention. However, it will be understood by those skilled in the art that embodiments of the invention may be practiced without some or all of these specific details. In other instances, well known process operations have not been described in detail in order to not unnecessarily obscure pertinent aspects of embodiments being described. In the drawings, like reference numerals refer to same or similar functionalities or features throughout the several views.

In order to address the problems and challenges faced by wireless communication network or data network operators in determining subscriber perspective or user-perspective throughput, the present disclosure provides methods and a network monitoring device to estimate a user-perceived delay in a wireless communication network or a data network by estimating a web page download time elapsed between a user's selection of a hyperlink or URI input in a web browser and complete web page download from a corresponding web server.

FIG. 1 illustrates architecture of an exemplary data network 10 according to an embodiment of the present invention. Referring to FIG. 1, a network monitoring device 100 (or a Multi-protocol probe, hereafter referred to as probe 100) connects to a link between a gateway 101 and an internal router 102 further connecting to a plurality of computing devices 103 in the data network 10. For the simplicity of illustration, only the router 102 is shown in FIG. 1, and there may be multiple computing devices connecting to the data network 10 through the router 102. Each computing device 103 is assigned at least one IP address. In the present disclosure, the computing device 103 represents at least one subscriber in the network 10. For the simplicity of illustration, only one server 170 is shown in FIG. 1, and the server 170 may be part of the network 10 or disposed in Internet which is external to the network 10. There may be at least one subscriber operating the at least one computing device 103 connected to the network 10. In the example shown in FIG. 1, the subscriber may operate the computing device 103 to download a web page to a web browser 104 in the computing device 103 from a corresponding web server such as the server 170.

The probe 100 transparently receives packets from a plurality of traffic flows directly associated with each computing device 103. It is noted that the probe 100 merely passively extracts copies of packets from traffic flows in the data network 10, transparently processes the received packets and does not affect transmission of the packets in the data network 10. The probe 100 is further configured to generate statistical reports based on the received packets and send the generated reports to a customer experience management (CEM) system 150 external to the probe 100. In other embodiments, the CEM 150 can be replaced by other data analysis processing devices.

Figure 2:
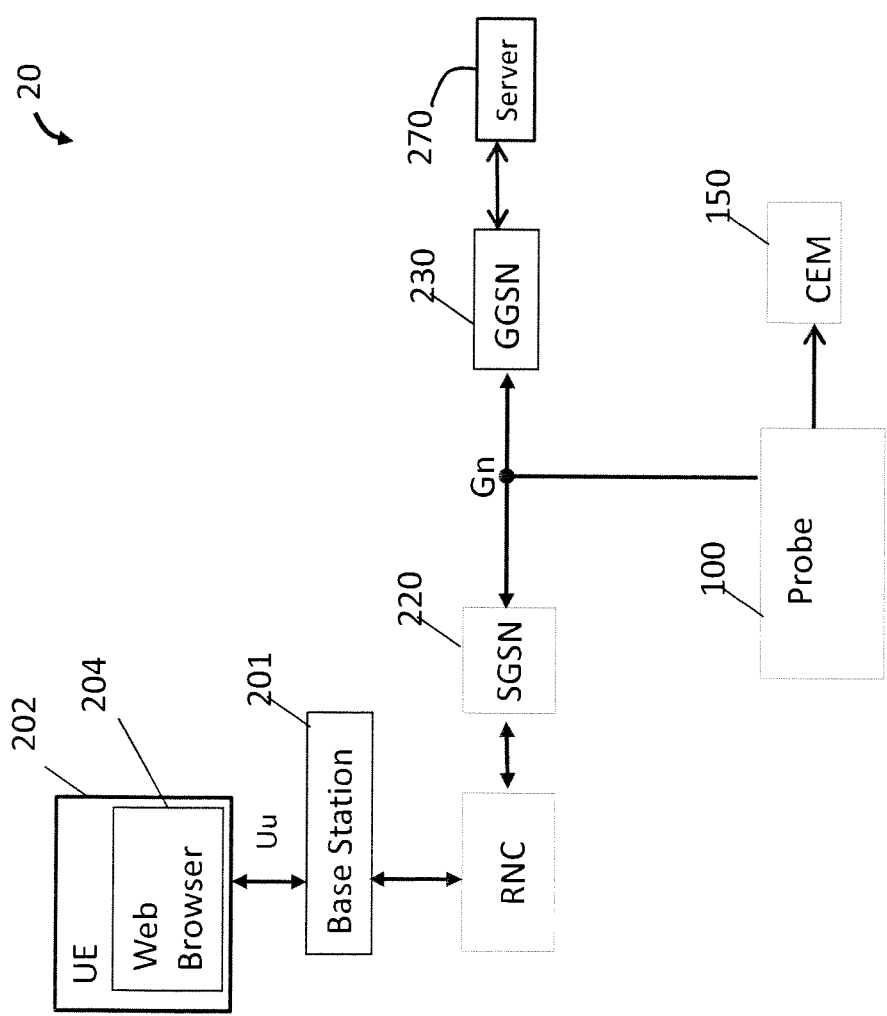
FIG. 2 illustrates architecture of an exemplary communication network 20 according to an embodiment of the present invention.

The invention may be applied to any data network using different communication protocol standards, e.g. Long Term Evolution (LTE) network, 3G network as defined in Third Generation Partnership Project (3GPP) Technical Specifications. In different data networks, the probe 100 may be deployed to sniff packets from a high speed link over different interfaces. For example, in a 3G network, the probe 100 may be deployed to sniff packets from a high speed link over Gn interface as shown in FIG. 2. In another example, in the LTE network shown in FIG. 3, the probe 100 may sniff traffic flows from LTE interfaces, for instance, LTE S1-U, S4, S11 and S12 interfaces over high speed links. Additionally, the probe 100 may be configured to sniff messages/signalling containers from control plane interfaces of LTE network.

FIG. 2 illustrates architecture of an exemplary communication network 20 according to an embodiment of the present invention. Referring to FIG. 2, in a 3G network, the probe 100 may connect to a link between Serving GPRS Support Node (SGSN) 220 and Gateway GPRS Support Node (GGSN) 230 to extract traffic flows. The traffic flows originate from, or transmit to, a user equipment (UE) 202 which is connected with the SGSN 220 via a base station 201 through an air interface Uu. The UE 202 receives packets from, and transmits packets to, the Internet via the GGSN 230. As shown in FIG. 2, the probe 100 may extract traffic flows from the Control-plane (C-Plane) and the User-Plane (U-Plane) via the Gn interface in the communication network 20, and then generate statistical reports based on packets received from the traffic flows and send the generated reports to a CEM system 150 external to the probe 100. In the present disclosure, the UE or the user device represents a subscriber in the network 20. For simplicity, only a server 270 is shown in FIG. 2, and the server 270 may be part of the network 20 or disposed in Internet which is external to the network 20. There is a web browser 204 disposed in the UE 202, and the subscriber can download web page(s) from a corresponding web server, such as the server 270, to the UE 202 and view the downloaded web page on the web browser 204.

Figure 3:
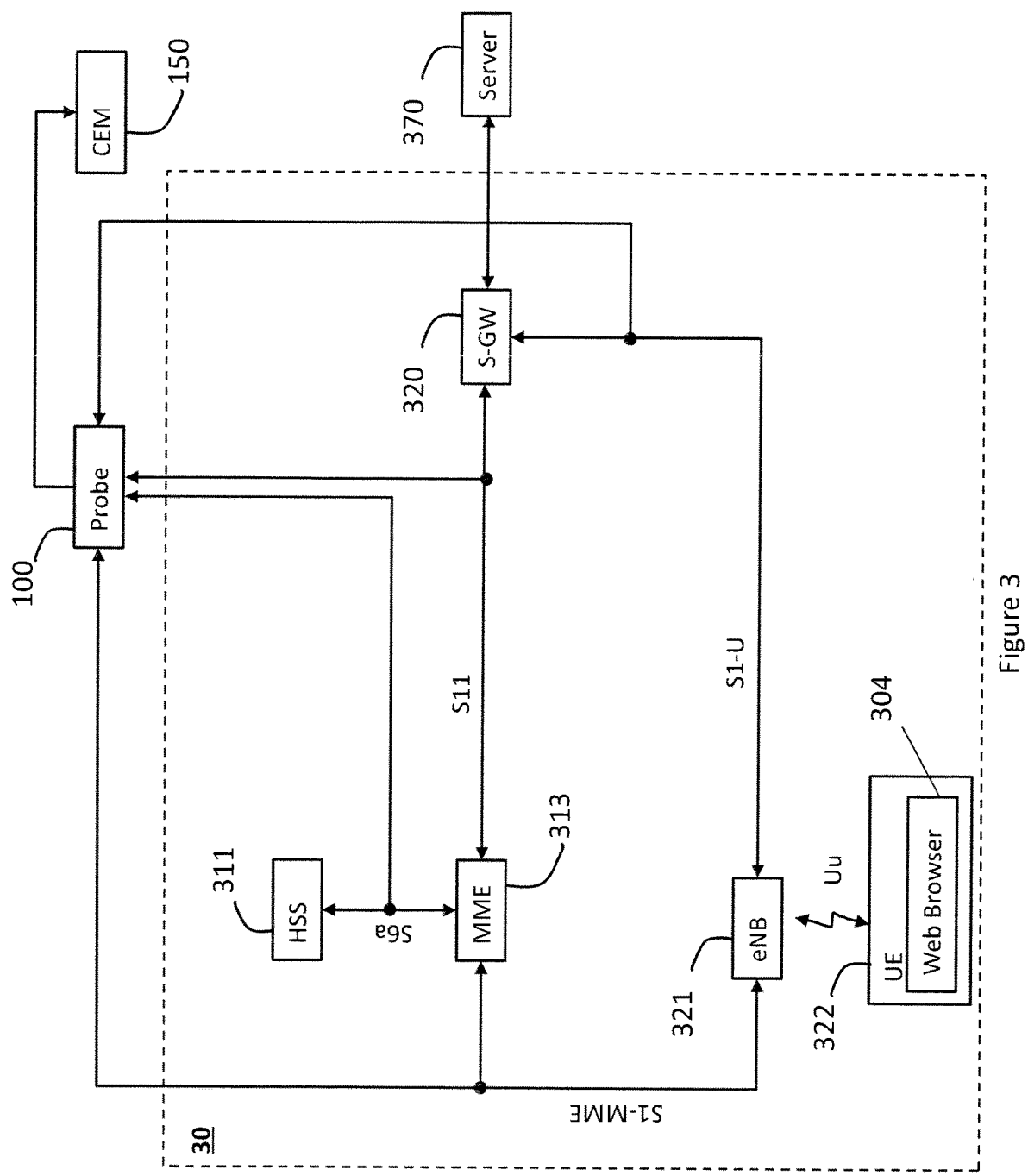
FIG. 3 illustrates architecture of an exemplary communication network 30 according to an embodiment of the present invention.

FIG. 3 illustrates architecture of an exemplary communication network 30 according to an embodiment of the present invention. Referring to FIG. 3, the probe 100 is configured to extract traffic flows from both the U-Plane and the C-Plane. The U-Plane traffic flows basically relate to Internet Protocol (IP) data packets transported between the UE 322 through the evolved NodeB (eNB) 321 and any servers in Cloud/Internet. Usually, the IP packets travel through high speed links between mobile devices/UEs and cloud/Internet via Serving Gateway (S-GW)/Service General Packet Radio Service Support Node (SGSN) 320. The C-Plane traffic flows are related to control information such as those transported between eNB 321 and Mobility Management Entity (MME) 313 for customers.

As shown in FIG. 3, the probe 100 may connect to a S1-U interface between eNB 321 and S-GW/SGSN 320 to extract traffic flows from the U-Plane, and connect to a S1-MME between eNB 321 and MME 313 to extract traffic flows from the C-Plane. In some embodiments, the probe 100 is connected to extract traffic flows from C-Plane via other C-Plane interface such as S6a interface between Home Subscriber Server (HSS) 311 and the MME 313. For simplicity, only one server 370 is shown in FIG. 3, and the server 370 may be part of the network 30 or disposed in Internet which is external to the network 30. There is a web browser 304 disposed in the UE 322, and the subscriber can download web page(s) from a corresponding web server, such as the server 370, to the UE 322 and view the downloaded web page on the web browser 304.

Prior to describing the operation of probe 100, the basic unit of statistical data collection, i.e. the traffic flow in the probe 100, is explained. In the present disclosure, three types of traffic flows are described when describing operations of probe 100. The concept of traffic flows is important to understand the U-Plane processing. Firstly, a directional Traffic Flow in Transmission Control Protocol/Internet Protocol (TCP/IP) networks is defined as: "a flow is a series of packets that share the same source and destination IP addresses, source and destination ports, and IP protocol. This is also called a five-tuple IP flow". The five-tuple may include: a source IP address; a source port number; a destination IP address; a destination port number; and an IP protocol.

Both source and destination addresses must be of the same type, i.e. IPv4 or IPv6 and the flow is directional. If the source and destination are swapped, it becomes a different flow. The IP protocol member specifies the Layer 4 protocol, e.g. TCP, UDP. In the present disclosure, the flow is also called a directional traffic flow. In 3G/LTE networks, on U-Plane, the directional traffic flow may be characterised by five-tuple and TEID due to IP encapsulation used in tunnelling of directional traffic flows. Directional traffic flows transmitted in different directions are assigned different TEIDs. For example, in 3G/LTE networks, the TEID is 32 bits long. In the present disclosure, a directional traffic flow may be called a "traffic flow".

In order to reliably detect application layer protocols, the probe 100 may use a deep packet inspection (DPI) engine to analyse traffic flows in both directions together. That is, the probe 100 analyses bi-directional traffic flows. In the present disclosure, analysis of traffic flows together in both directions is referred to as a "bi-directional traffic flow". A bi-directional traffic flow groups the two directional traffic flows corresponding to opposite directions together. That is to say, the source of one directional traffic flow corresponds to the destination of the other directional traffic flow in the opposite direction. The bi-directional traffic flow is specified by a five-tuple similar to the directional traffic flow, which may include: a lower IP address; a lower port number; an upper IP address; an upper port number; and a Layer 4 protocol.

In a bi-directional traffic flow, instead of a source and a destination address, the five-tuple includes a lower and an upper address. "Lower" refers to a numerically smaller value and "upper" refers to a numerically greater value. Lower port number refers to the port associated with the lower IP address and not the numerically lower port number.

The real IP traffic traversing in the communication network and data network is related to application traffic flow(s) of end users/subscribers. The application traffic flow is a concept used in the statistical reports generated by the probe 100 and sent to, for example, the CEM 150 or an external data analysis processing device for further processing and analysis. An application traffic flow is specified by a three-tuple, which may include: an internal IP address; an external IP address; and an application ID (Identifier). The internal IP address is the IP address of the UE or the mobile phone and is internal to the operator's network. The external address is external to the operator's network, most likely in the Internet. The application ID corresponds to the Layer 7 or application layer protocol, e.g. HTTP, IMAP, and so forth. This three-tuple is bi-directional similar to the five-tuple of a bi-directional flow. It is also similar in that the application ID generally identifies the destination port and the IP protocol, except when a server is using an unconventional port number for that application/protocol. Essentially, an application traffic flow is the aggregation of possibly multiple bi-directional traffic flows. For example, suppose a UE is connected to a website and has multiple pages open, there will be multiple bi-directional flows each with a different source port in the HTTP between that UE and the web server. In the present disclosure, an application traffic flow may refer to traffic flows from one UE with the same application protocol, or all traffic flows to a specific destination/application server belonging to a particular application protocol.

In order to calculate statistical data of an active traffic flow(s), such as throughput of a particular subscriber on U-Plane, the probe 100 receives IP packets from directional traffic flows on both C-Plane and U-Plane, generates statistical data for bi-directional traffic flows and then uses the generated statistical data and other related identification information extracted from the bi-directional traffic flows to calculate the statistic data of a particular application traffic flow/particular directional traffic flow on U-Plane. The probe 100 may further use the identifier information obtained from C-Plane such as Fully Qualified Tunnel End Identifier (FTEID), International Mobile Subscriber Identity (IMSI) or Globally Unique Temporary ID (GUTI) to correlate statistic data of a particular application traffic flow/particular directional traffic flow with a subscriber in the data network. After the Probe 100 calculates the statistic data of traffic flows corresponding to a large number of customers/subscribers, the calculated statistic data are output or transferred from the probe 100 to the CEM 150 as shown in FIGS. 1-4.

Figure 4:
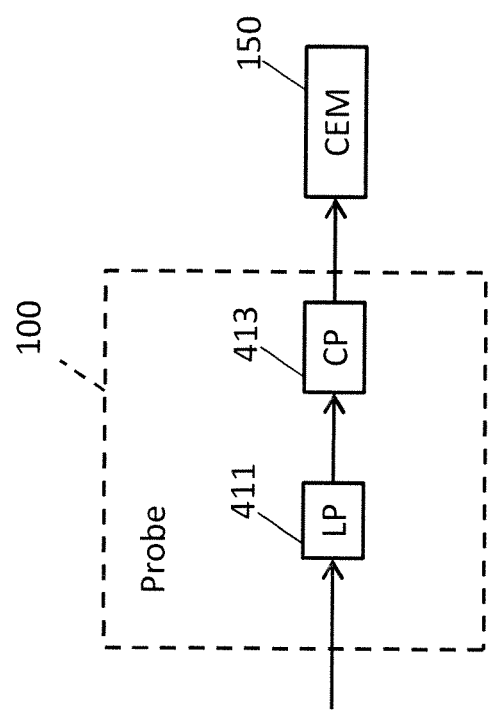
FIG. 4 shows major processing elements in a probe 100 according to an embodiment of the present invention.

FIG. 4 shows major processing elements in a probe 100 according to an embodiment of the present invention. The process of statistical calculation in the probe 100 may be explained with reference to FIG. 4. As shown in FIG. 4, the probe 100 may include a link processor (LP) 411 connected to a correlation processor (CP) 413. In another embodiment, the probe 100 may include more than one LP 411 connected to the CP 413. When a plurality of LPs 411 are used to process incoming traffic flows, the LPs 411 work in parallel to extract directional traffic flows, and apply detection on IP packets on each directional traffic flow in order to extract information from the IP packets.

In order to calculate statistical data of all directional traffic flows or application traffic flows from one UE belonging to a particular application protocol, e.g. HTTP, FTP etc, the probe 100 may use the DPI engine operating in the LP 411 to obtain application layer protocol of the received packets in bi-directional traffic flows. The application layer protocol has unique Application ID in the three-tuple definition of the application traffic flow.

Before each request-response message/packet for any application traffic flow occurs on U-Plane, there may be at least one or some control signalling or control messages transferred on C-Plane, and the LP 411 of the Probe 100 may extract customer/subscriber information thereon, such as FTEID, IMSI, GUTI, eNB-UE-S1APID, MME-UE-S1APID and so forth. Thus, the CP 413 receiving output from one or more LP 411 will further correlate the application traffic flows with the customer/subscriber information in the control signalling or control messages. Subsequently, the CP 413 generates a traffic flow statistical report for individual customer(s)/subscriber(s) and transmit the traffic flow statistic report to the CEM 150 or an external data processing analysis device.

According to an embodiment of the invention, each LP 411 in the Probe 100 reports active flow reports of each traffic flow in a preconfigured data structure to the CP 413. Each data structure is a nested structure and may include at least the following pre-configured information: an upper IP address; a lower IP address; an upper port number; a lower port number; an Application ID; a downlink statistic data structure; and an uplink statistic data structure.

The Downlink statistical data structure for one bi-directional traffic flow includes at least the following information: "Number of bytes" received from the downlink traffic flow; "Number of packets" received from the downlink traffic flow; "Active Second Vector" for current report period, which is configured to record the active seconds of downlink traffic flow within the current reporting period; "Period Octet Vector" for current report period, which is configured to accumulate and store statistical data of the downlink traffic flow within the current reporting period, e.g. the number of bytes and the number of packets transferred in the downlink traffic flow; FTEID of the directional traffic flow. In 3G/LTE networks, FTEID includes TEID and Layer 3 IP address of GTP packets. This Layer 3 IP address is only for routing encapsulated IP packet inside the LTE network.

The Uplink statistical data structure for the same bi-directional traffic flow includes at least the following information: "Number of bytes" received from the uplink traffic flow; "Number of packets" received from the uplink traffic flow; "Active Second Vector" for current report period, which is configured to record the active seconds of uplink traffic flow within the current reporting period; "Period Octet Vector" for current report period, which is configured to accumulate and store statistic data of the uplink traffic flow within the current reporting period, e.g. the number of bytes and the number of packets transferred in the uplink traffic flow; FTEID of the directional traffic flow.

Figure 5:
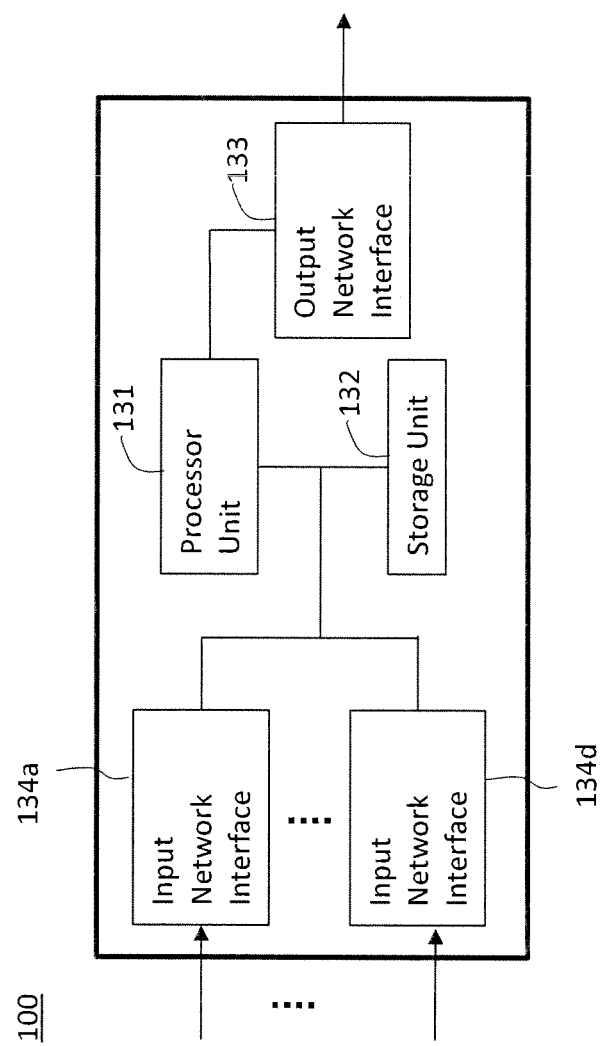
FIG. 5 is a schematic diagram of physical components of the monitoring probe 100.

FIG. 5 is a schematic diagram of the physical components of the probe 100. The probe 100 includes a processor unit 131, a storage unit 132, an output network interface 133, and one or more input network interfaces 134a . . . 134d. It is envisaged that the probe 100 will typically include more than one input network interface 134. However, those skilled in the art will appreciate that the probe 100 may include only one input network interface 134. For example, in an embodiment of the probe 100 configured to only monitor for control plane messages transmitted from the eNB 321 to the MME 313 on the S1-MME interface, the probe 100 may have only one input network interface 134.

For example, each of the input network interfaces 134a . . . 134d is connected to a respective one of the eNB 321, MME 313, HSS 311 and S-GW 320 on a high-speed link. The processor unit 131 is configured to implement (or execute) a number of software modules based on program code and/or data stored in the storage unit 132. The storage unit 132 stores program code for implementing software modules for identifying a user plane identifier of the UE 202/UE 322 and also correlate the control plane identifier and the user plane identifier of the UE 202/UE 322.

Figure 6:
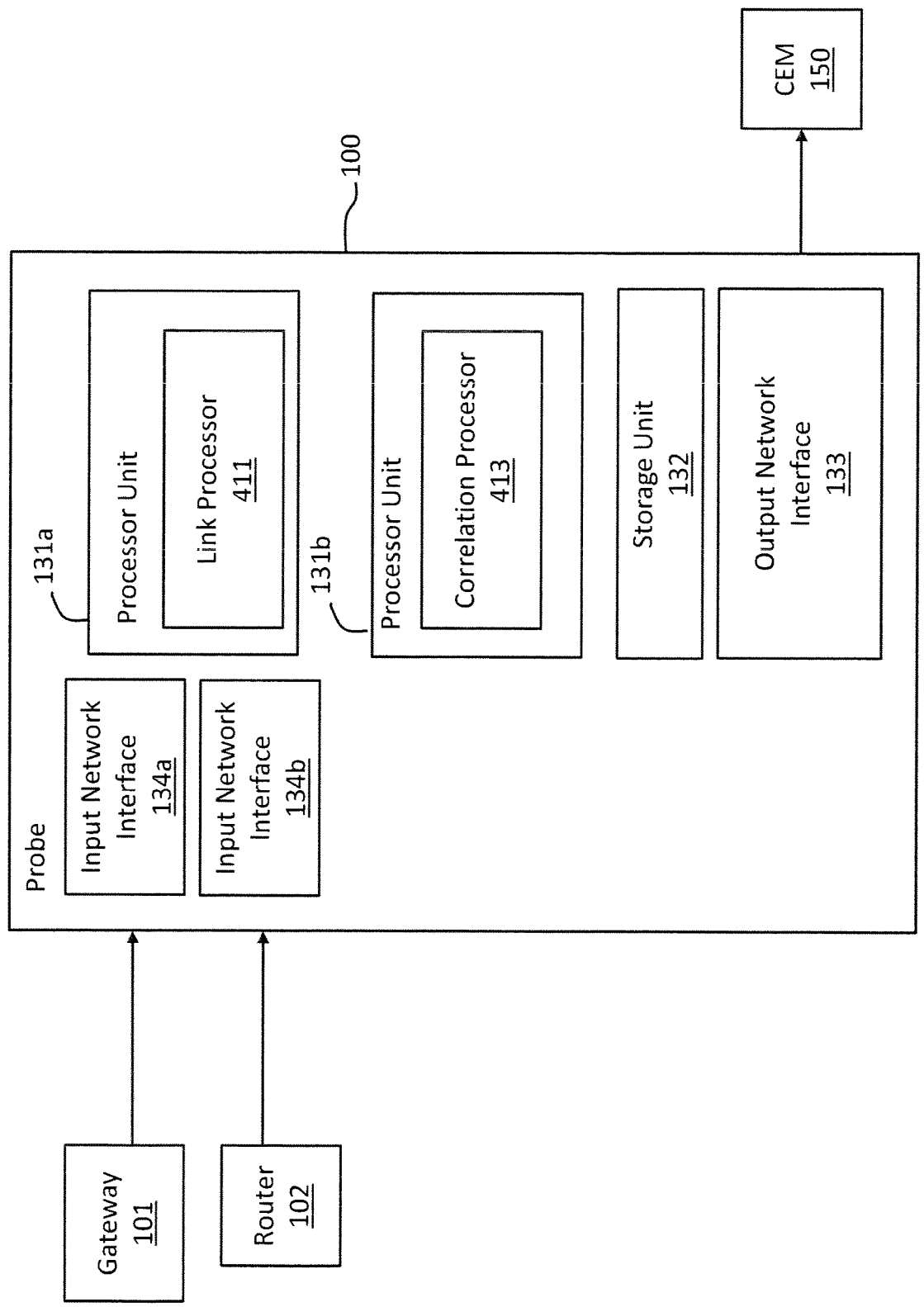
FIG. 6 is a schematic diagram of the functional components of the network monitoring device 100 for estimating user-perceived delay for one of computing device 103 in the data network 10.

FIG. 6 is a schematic diagram of the functional components of the probe 100 for estimating user-perceived delay for a computing device 103 in the data network 10. In this embodiment, the functional components are software modules implemented by the processor unit 131a and 131b of the probe 100. However, those skilled in the art will appreciate that one or more of the functional components could alternatively be implemented in some other way, for example by one or more dedicated electronic circuits. Also, the user-perceived delay may be web page/home page download time.

One of the software modules implemented by the processor unit 131a is a LP 411. The LP 411 is adapted to monitor one or more of the network devices of the data network 10 for receipt of at least one control plane message and/or user plane data packet. Each of the control plane messages/user plane data packets comprise at least one control plane identifier. At least one of the control plane messages/user plane data packets comprises at least one user device identifier, and at least another one of the control plane messages comprises at least one user plane identifier. For example, the LP 411 may be configured to detect the type of messages received from the network 10.

Referring to FIG. 6, the processor unit 131*a* is electrically connected to at least one Input Network Interface 134*a*, 134*b*. In some embodiments, the processor unit 131*a* is electrically connected to Input Network Interfaces 134*a*-134*b*. Also, the processor unit 131*a* and 131*b* are connected to the storage unit 132 and the output network interface 133. A datagram monitor monitors a gateway 101 and a router 102 for receipt of control plane messages or user plane data packets. Other software modules implemented by processor unit 131*b* is a CP 413. The CP 413 analyses the active traffic flow report, generated by the LP 411, corresponding to traffic flows of each user device in the data network 10, detects burst(s) in the received traffic flows within a preconfigured monitoring period, calculates web page download time of each user device under control of each subscriber according to the detected burst(s), and then outputs the calculated web page download time of each subscriber via the output network interface 133 to the CEM 150 or another data analysis processing device. For example, the CP 413 may be configured to detect a burst according to an aggregated active second vector in an aggregated traffic flow(s) received by the LP 411.

In an alternative embodiment, the LP 411 in the processor unit 131*a* and/or the CP 413 in the processor unit 131*b* may be implemented as dedicated electronic circuits.

Figure 7:
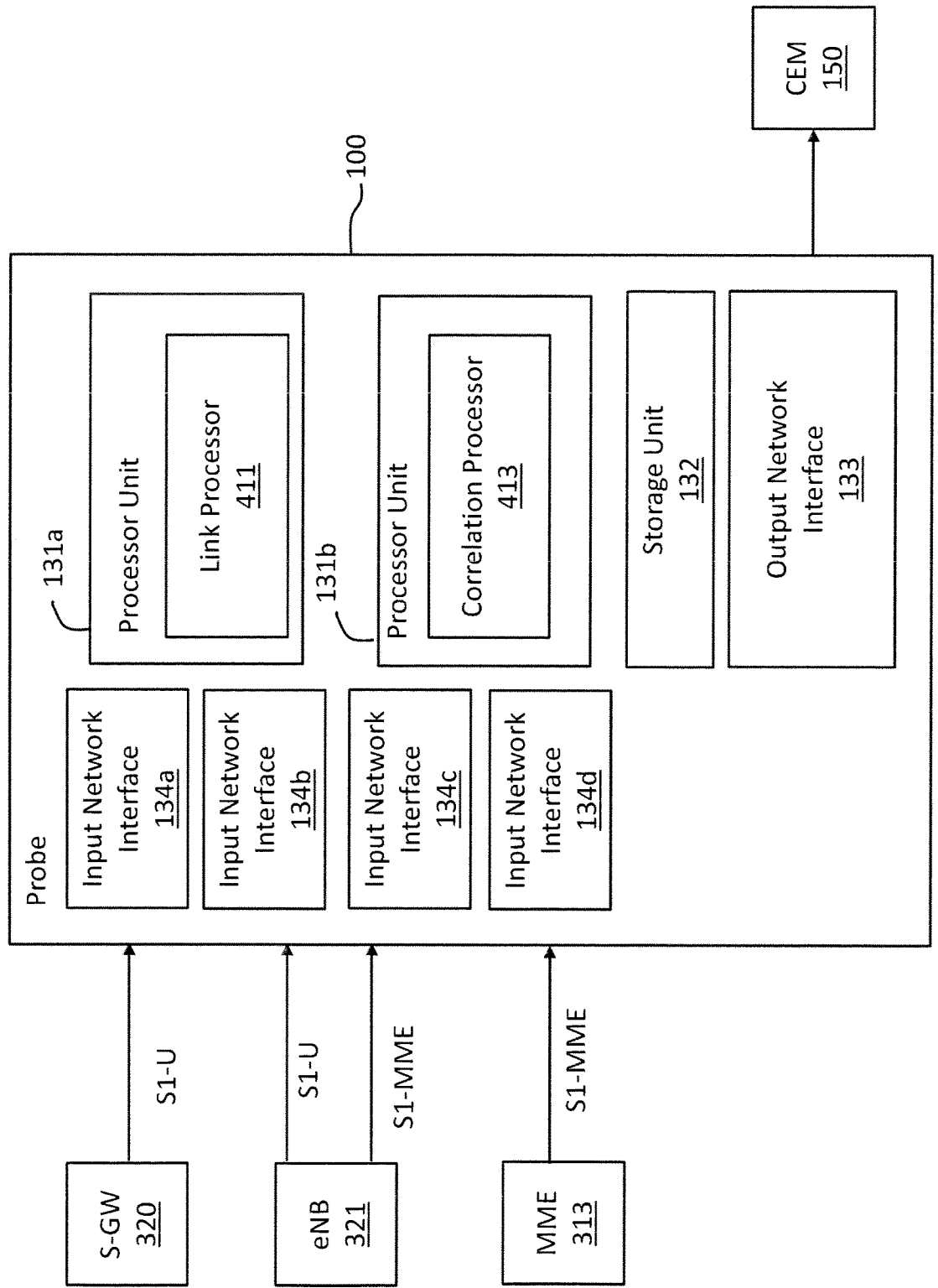
FIG. 7 is a schematic diagram of the functional components of the network monitoring probe 100 for estimating user-perceived delay for a user device in the communication network 30.

FIG. 7 is a schematic diagram of the functional components of the network monitoring probe 100 for estimating user-perceived delay for a user device in the communication network 30. In this embodiment, the functional components are software modules implemented by the processor unit 131*a* and 131*b* of the probe 100. However, those skilled in the art will appreciate that one or more of the functional components may alternatively be implemented in some other way, for example by one or more dedicated electronic circuits.

The LP 411 implemented in the processor unit 131*a* is adapted to monitor one or more of the network devices of the communication network 30 for receipt of at least one control plane message and/or user plane data packet. Each of the control plane messages/user plane data packets comprises at least one control plane identifier. At least one of the control plane messages/user plane data packets comprises at least one user device identifier, and at least another one of the control plane messages comprises at least one user plane identifier. For example, the LP 411 may be configured to detect the type of messages received from the network.30.

Referring to FIG. 7, the processor unit 131*a* is electrically connected to at least one Input Network Interface 134*a*, 134*b*, 134*c*, 134*d* in order to monitor control plane messages or user plane data packets coming from the S-GW 320, the eNB 321 and MME 313 via the Input Network Interfaces 134*a*, 134*b*, 134*c*, 134*d* respectively. In some embodiments, the processor unit 131*a* is merely connected to Input Network Interfaces 134*a*-134*d* for monitoring user plane data packets coming from the S-GW 320 and the eNB 321. Also, the processor unit 131*a* is connected to the storage unit 132 and the output network interface 133. The LP 411 monitors the eNB 321 and the MME 313 for receipt of control plane messages or user plane data packets. The LP 411 analyses the IP packets received on traffic flows corresponding to each subscriber in the communication network and generates active traffic reports for each traffic flow received from the network 30.

The CP 413 implemented in the processor unit 131*b* detects burst(s) in the aggregated active flow report received from the LP 411 within a preconfigured monitoring period, calculates web page download time of each user device under control of each subscriber according to the detected burst(s), and may then output the calculated throughput of each subscriber via the output network interface 133 to the CEM 150 or another data analysis processing device. For another example, the CP 413 may be configured to calculate time elapsed between a first message and a second message subsequent to the first message received by the LP 411.

In an alternative embodiment, the LP 411 in the processor unit 131*a* and/or the CP 413 in the processor unit 131*b* may be implemented as dedicated electronic circuits.

In yet another embodiment, the Input Network Interfaces 134*a*-134*b* may be respectively connected to GGSN 230 and the SGSN 220 in the network 20. The LP 411 monitors the GGSN 230 and the SGSN 220 for receipt of control plane messages or user plane data packets. The LP 411 analyses the IP packets received on traffic flows corresponding to each subscriber in the communication network 20 and generates active flow reports for each traffic flow. Then the CP 413 detects burst(s) in the aggregated traffic flow reports received from the LP 411 within a preconfigured monitoring period, calculates web page download time of each user device under control of each subscriber according to the detected burst(s), and may then output the calculated web page download time of each subscriber through a metrics output (via the output network interface 133) to the CEM 150 or another data analysis processing device. For another example, the CP 413 may be configured to detect a burst according to an aggregated active second vector in aggregated traffic flow(s) received by the datagram monitor 313.

The probe 100 shown in FIGS. 1 to 7 is proposed to estimate web page download time of a user device in the network. The web page download time may refer to the time elapsed from a user's selection of a hyperlink or inputting URI on a web browser and complete download of a web page to the user's device from a corresponding web server, e.g, the server 170, 270, 370. For example, the probe 100 can be deployed in a wireless communication network or a data network for sniffing user plane data packets or control plane messages or signaling. The CP 413 correlates the active traffic flows with corresponding control plane parameters received from the LP 411.

Figure 8:
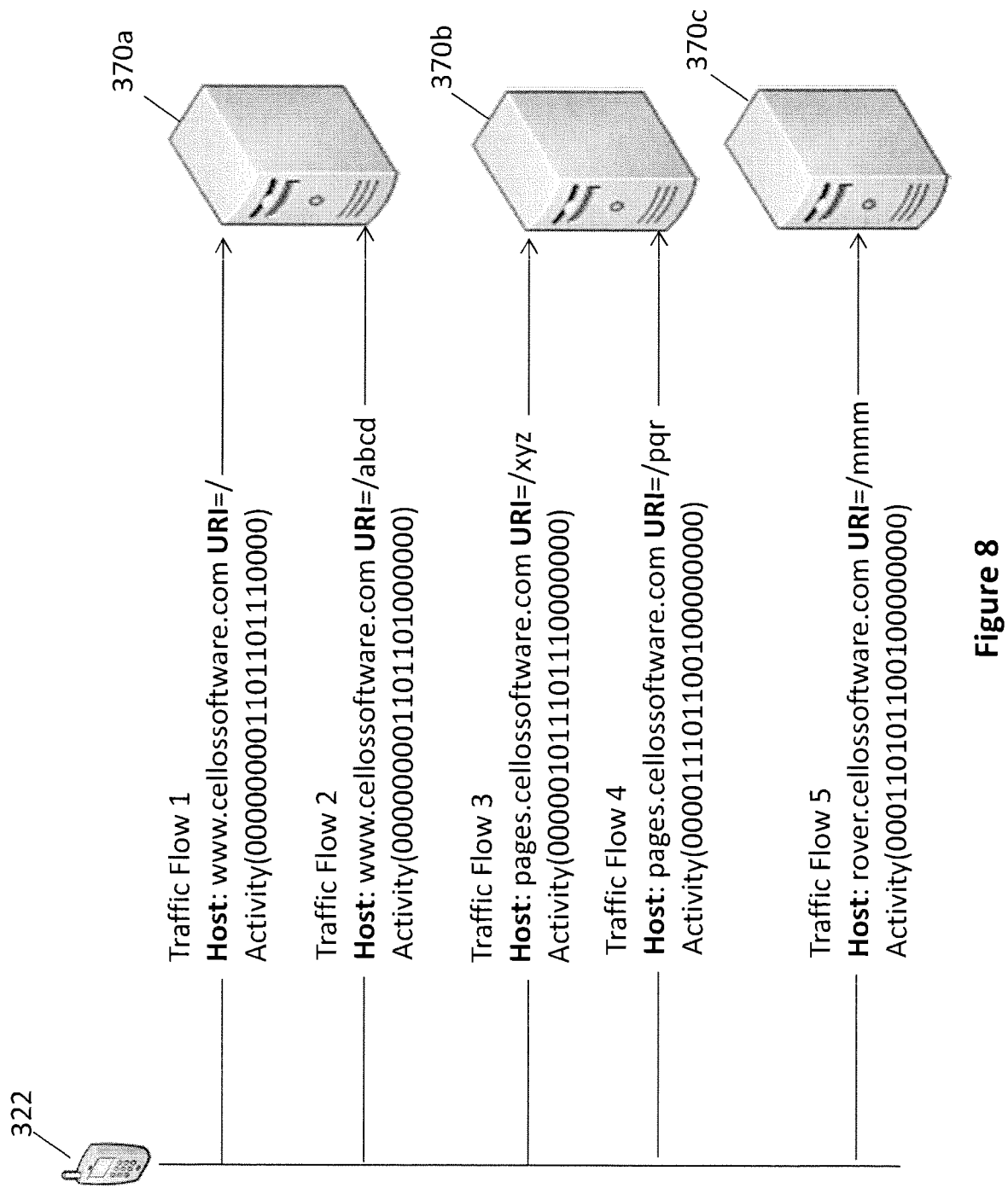
FIG. 8 is a schematic diagram illustrating an example of a web session consisting of multiple active traffic flows.

FIG. 8 is a schematic diagram illustrating an example of a web session consisting of multiple active traffic flows. For example, as shown in FIG. 8, when the subscriber operating the UE 322 in the network 30 selects a web page associated with a domain of "cellossoftware.com", the application layer request message such as Hypertext Transfer Protocol (HTTP) GET Request (REQ) message sent by the browser of the UE 322 may be re-directed to corresponding web servers 370*a*, 370*b* and 370*c*. In this particular example, there will be active traffic flows 1, 2, 3, 4, and 5 involved to deliver the required web page content to the web browser of the UE 322. When all web page contents provided from the corresponding web servers 370*a*, 370*b* and 370*c* are received by the UE 322, the web browser can then display the complete web page. A total of 5 active traffic flows are shown in FIG. 8:

(1) Active Traffic Flow 1, which corresponds to an application flow associated with Host of "www.cellossoftware. com" and URI of "/", and the Activity (0000000011011011110000) at the end refers to the active second vector generated by the LP 411 when detecting IP packet(s) corresponding to the Active Traffic Flow 1;

(2) Active Traffic Flow 2, which corresponds to an application flow associated with Host of "www.cellossoftware.com" and URI of "/abcd", and the Activity (000000001101101000000) refers to the active second vector generated by the LP 411 when detecting IP packet(s) corresponding to the Active Traffic Flow 2;

(3) Active Traffic Flow 3, which corresponds to an application flow associated with Host of "pages.cellossoftware.com" and URI of "/xyz", and the Activity (000001011101110000000) refers to the active second vector generated by the LP 411 when detecting IP packet(s) corresponding to the Active Traffic Flow 3;

(4) Active Traffic Flow 4, which corresponds to an application flow associated with Host of "pages.cellossoftware.com" and URI of "/pqr", and the Activity (000011101100100000000) refers to the active second vector generated by the LP 411 when detecting IP packet(s) corresponding to the Active Traffic Flow 4;

(5) Active Traffic Flow 5, which corresponds to an application flow associated with Host of "rover.cellossoftware.com" and URI of "/mmm", and the Activity (000110101100100000000) refers to the active second vector generated by the LP 411 when detecting IP packet(s) corresponding to the Active Traffic Flow 5.

In addition, when the LP 411 does not detect receipt of any IP packet in a particular second, the LP 411 marks an element of the active second vector as "0"; otherwise, the LP 411 marks an element of the active second vector as "1" to indicate receipt of at least one IP packet corresponding to an active traffic flow. By observation in a live network, there may be multiple active IP packets corresponding to the same web session of the same subscriber, transferred over the networks 10, 20, 30 within an active second. In other words, when an element of an active second vector is marked as "1", it could represent that at least one active IP packet was transferred from the user device or to the user device in the network.

FIG. 9 illustrates the correlation processor aggregating all active second vectors of active traffic flows corresponding to the same domain of a web session corresponding to a user device. All active second vectors of Active Traffic Flow 1, 2, 3, 4, 5 are generated by the LP 411 and correspond to the activity shown in FIG. 8. Also, the CP 413 aggregates active second vectors of the active traffic flows according to configured domain grouping, which means that active traffic flows of the same subscribers may be grouped first as they refer to the same domain, and the CP 413 continuously accepts manual input of the domain grouping or automatically updates a configured domain grouping file, which may be stored in the storage unit 132. The resultant aggregated active second vector corresponding to the configured domain group of "cellossoftware.com" is shown at bottom of FIG. 9.

Figure 10:
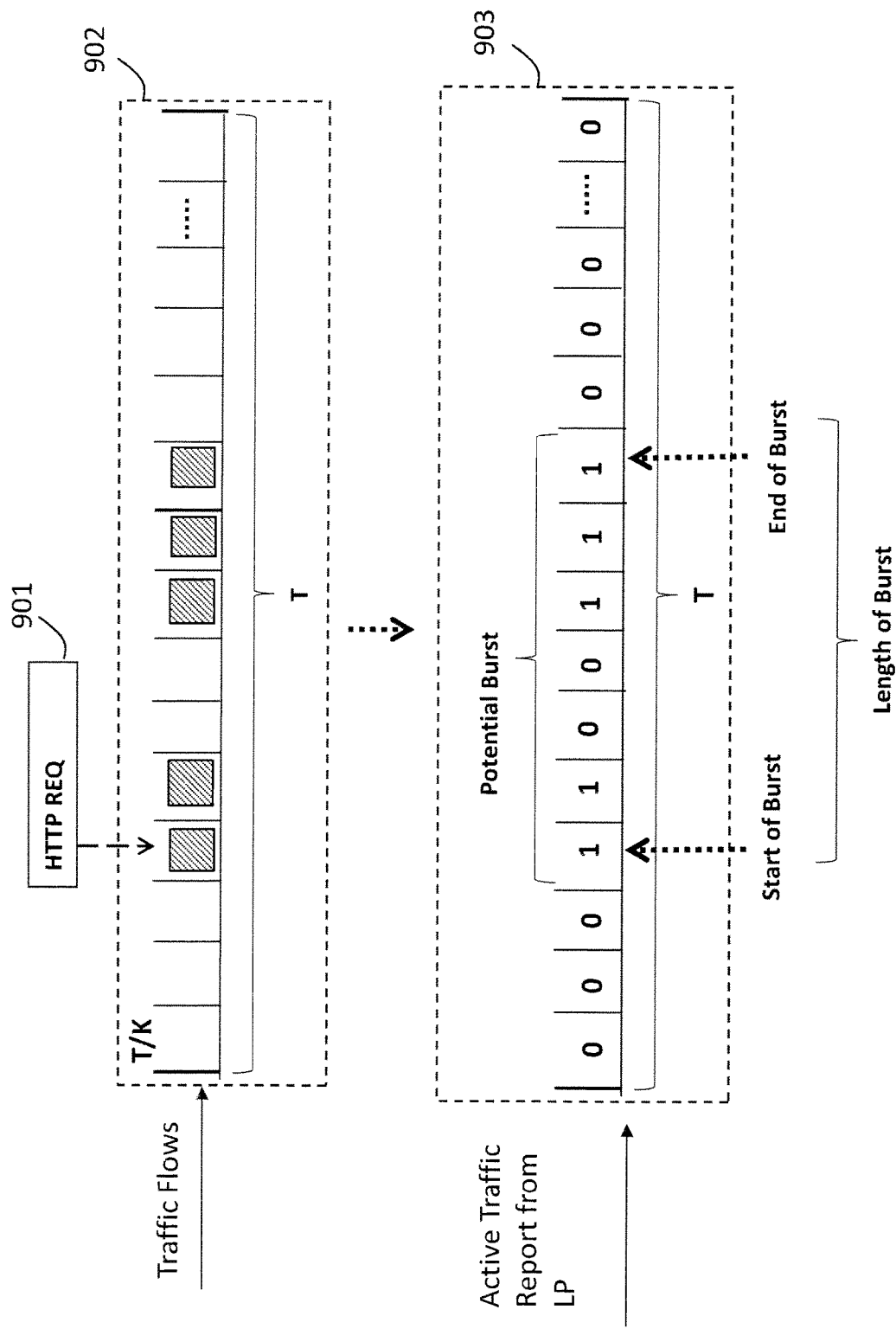
FIG. 10 illustrates a logical process of detecting an application layer request message in an active traffic flow of an application flow corresponding to a web session of a subscriber and the subsequent burst detection in the aggregated active second vector.

FIG. 10 illustrates a logic process of detecting application layer request messages in an active traffic flow of an application flow corresponding to a web session of a subscriber and the subsequent burst detection in the aggregated active second vector. First, apart from the active second vector generated by the LP 411, the LP 411 also includes the timestamp of HTTP GET REQ message received by the LP 411 and the Host and URI in the HTTP GET REQ message in the active flow report, and the timestamp may be generated by any of the Input Network Interface 134a-134d. As shown in FIG. 10, an IP packet carrying the HTTP GET REQ message (labelled as 901) is detected by the LP 411 during one of the active second periods among K of intervals during a configured monitoring period T, where K may be, for example, 60 and the configured monitoring period T may be, for example, 60 seconds. The active second vector 902 later will be included in an active traffic report by the LP 411 and output to the CP 413.

In the bottom half of FIG. 10, the CP 413 aggregates multiple active second vectors from multiple active traffic reports from the LP 411 according to a configured domain group and thus forms an aggregated active second vector 903. Within the aggregated active second vector 903, the CP 413 continues to detect burst(s) corresponding to the web session directly related to the HTTP GET REQ message detected by the LP 411. In particular, in the process of detecting a burst corresponding to downloading a web page on a user device, the CP 413 may identify a start of the burst, an end of the burst and determine the length of the burst according to the start and the end of the burst. The CP 413 may then estimate the web page download time according to the determined length of the burst. If the CP 413 is configured to estimate home page download time, tthe CP 413 will further perform detection of a home page according to a configured home page list, which may be stored in the storage unit 132.

Figure 11:
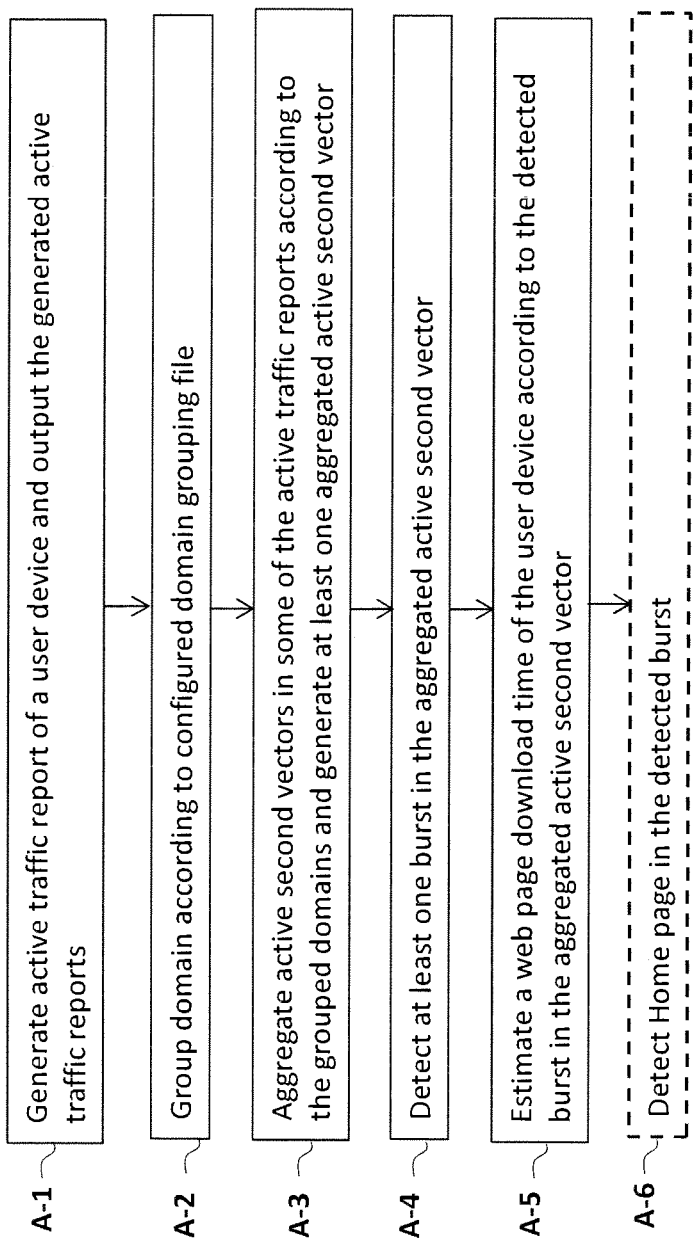
FIG. 11 is an exemplary flowchart illustrating a high level description of a method of estimating web page download time of a user device by the probe 100 according to an exemplary embodiment.

FIG. 11 is an exemplary flowchart illustrating a high level description of a method of estimating web page download time of a user device by the probe 100 according to an exemplary embodiment. Referring to FIG. 11 and FIG. 6 or 7, the method of estimating web page download time of a user device by the probe 100 may include following steps A-1 to A-4.

At step A-1, the LP 411 generates active traffic reports of active traffic flows corresponding to a user device 322 within a configured monitoring period T and outputs the generated active traffic reports to the CP 413.

At the step A-1, the LP 411 also provides the timestamp of the HTTP GET REQ message and HTTP GET response message in the corresponding active traffic report to the CP 413. Since the LP 411 and the CP 413 are time-synchronized, the CP 413 can map the HTTP GET REQ message and/or HTTP GET response message to the active second vector of the corresponding traffic flow.

At step A-2, the CP 413 receives the active traffic reports of the user device 322 and groups domains according to a configured domain grouping file for a present monitoring period. Also at step A-2, the CP 413 may update the configured domain grouping file according to traffic flows received continuously by the LP 411. The detailed procedure of grouping domains will be described below with reference to Table 1.

At step A-3, the CP 413 aggregates active second vectors in some of the received active traffic reports according to grouped domain(s) in the configured domain grouping file for the present monitoring period.

At step A-4, the CP 413 detects at least one burst in the aggregated active second vector for the present monitoring period. The detailed procedures of step A-4 will be described below with reference to FIGS. 12 and 13.

At step A-5, the CP 413 then estimates a web page download time of the user device 322 according to the at least one detected burst for the present monitoring period. In order to illustrate more clearly, the CP 413 determines the starting point of the detected burst, the end point of the detected burst and a burst duration of the detected burst according to the determined starting and ending point of the burst. The CP 413 then estimates the web page download time of the user device according to the determined burst duration. The CP 413 may also output the estimated web page download time of the user device 322 to the CEM 150 at a configured reporting time or a pre-determined reporting time.

At step A-6, the CP 413 continues to detect a home page in the aggregated traffic flows corresponding to the aggregated active second vector. The step A-5 is optional and if the CP 413 performs the step A-6, the CP 413 can further estimate a home page download time of the user device 322. When a home page is detected in the aggregated active second vector, the CP 413 can estimate home page download time before outputting the estimated home page download time to the CEM 150.

Returning to step A-2, the CP 413 performs the domain grouping for the user device 322. According to observations on live networks, different user devices or even the same user device requesting the same web page may be served by different web server(s). In reality, a managing web server accepting HTTP GET REQ messages from user devices may re-direct the HTTP GET REQ messages to a plurality of web servers for load distributions. A more complicated situation arises when the web page contains Check Cascading Style Sheets (CSS) objects, image objects, video objects and advertisements provided by third party companies. In the present invention, the server controlled by the third party advertisement company is not taken into account in the domain grouping. Only those web server(s) which may directly be controlled by the company hosts the web server are considered in the domain grouping. For example, Table 1 below illustrates "Domain Grouping Configuration" which is normally configured manually by the operator of the network 10, 20, 30.

TABLE 1

Domain Grouping Configuration

[ebay.in]
"ebay.in", "ebay.com", "ebayimg.com", "ebayrtm.com", "ebaystatic.com"
[edition.cnn.com]
"cnn.com", "batpmturner.com", "turner.com"
[google.com]
"google.com", "google.co.in", "gstatic.com"
[mobile.google.com]
"m.google.com"
[microsoft.com]
"microsoft.com", "s-microsoft.com", "aspnetcdn.com", "bing.com"

By observations in the IP packet and HTTP GET REQ messages traversed across the network 10, 20 or 30, some managing web servers may re-direct the original HTTP GET REQ message from user devices to web server(s) with very different host names or URI. For example, in Table 1, the "ebay.in", "ebay.com", "ebayimg.com", "ebayrtm.com", "ebaystatic.com" are all web servers which may be used for re-direction when the subscriber attempts to access web page of "ebay.in". As such, the "ebay.in", "ebay.com", "ebayimg.com", "ebayrtm.com", "ebaystatic.com" can be grouped under the same domain of "ebay.in". Similarly, "microsoft.com", "s-microsoft.com", "aspnetcdn.com", "bing.com" may be grouped under the same domain of "microsoft.com".

At the step A-2, when the CP 413 groups domains according to the configured domain grouping file, the CP 413 groups active traffic reports corresponding to the active traffic flows in which the HTTP GET REQ messages are detected within the current configured monitoring period and also the host or URI of the HTTP GET REQ message belonging to the same domain according to the configured domain grouping file (such as the "Domain Grouping Configuration" shown in Table 1). In other words, for a user device, the CP 413 groups all active traffic flows with host or URI belonging to the same domain (according to the configured domain grouping file) and the same IP address of the user device, then in a later procedure of step A-3, the CP 413 aggregates the active traffic flows with host or URI belonging to the same domain.

Figure 12:
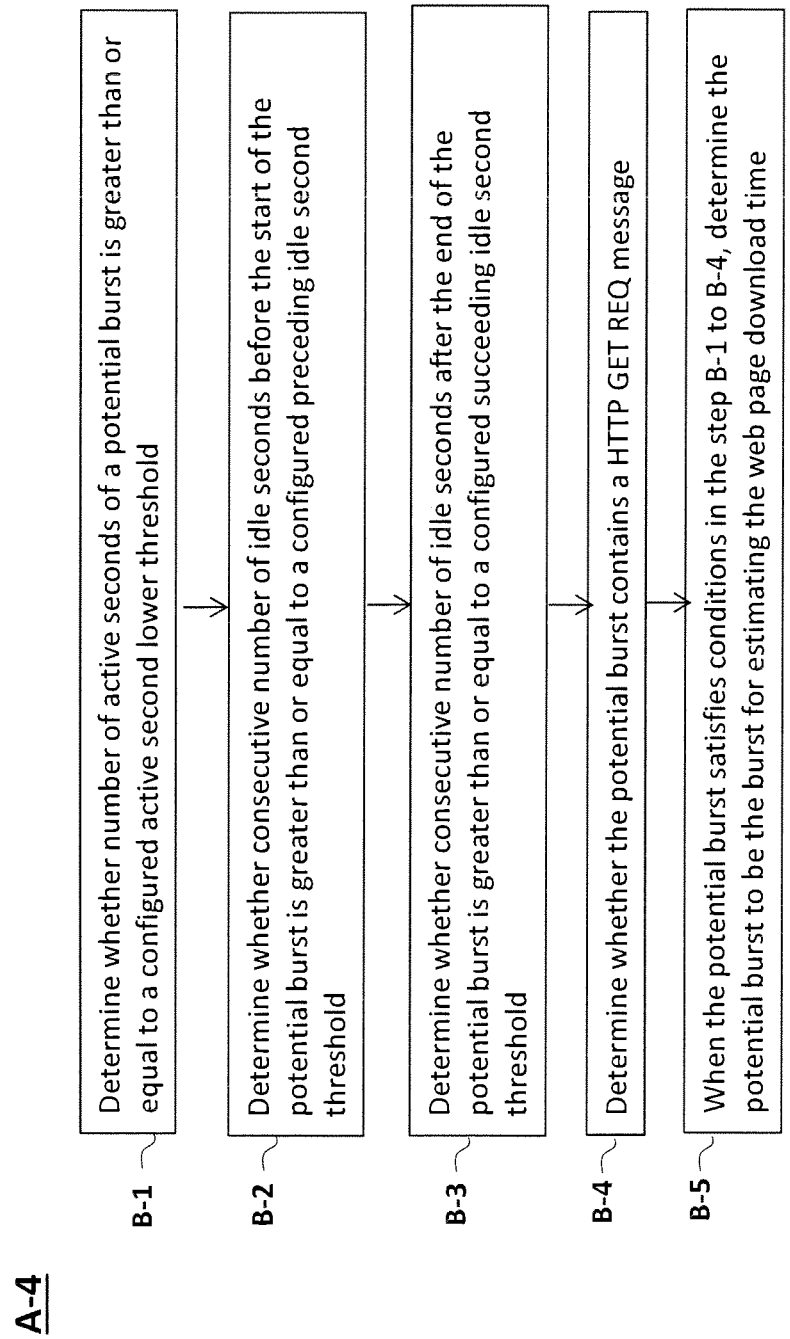
FIG. 12 is an exemplary flowchart illustrating a method of detecting burst(s) in an aggregated active second vector of a user device by the probe according to an exemplary embodiment.

FIG. 12 is an exemplary flowchart illustrating a method of detecting a burst in an aggregated active second vector of a user device by probe 100 according to an exemplary embodiment. The flowchart shown in FIG. 12 describes procedures of the step A-4 in detail and include the following steps B-1 to B-4.

At step B-1, the CP 413 determines whether the number of active seconds of a potential burst is greater than or equal to a configured active second lower threshold. The active second refers to the "1" similar to that shown in FIG. 10. For example, the configured active second lower threshold may be 6, however the configured active second lower threshold can be adjusted according to network operational condition(s).

At step B-2, the CP 413 determines whether the consecutive number of idle seconds before the start of the potential burst is greater than or equal to a configured preceding idle second threshold. The idle second refers to the "0" similar to that shown in FIG. 10. For example, the configured preceding idle second threshold may be 2, however the configured preceding idle second threshold can be adjusted according to network operational condition(s).

At step B-3, the CP 413 determines whether the consecutive number of idle seconds after the end of the potential burst is greater than or equal to a configured succeeding idle second threshold. For example, the configured succeeding idle second threshold may be 4; however the configured succeeding idle second threshold can be adjusted according to network operational condition(s).

At step B-4, the CP 413 determines whether the potential burst contains a HTTP GET REQ message. At step B-5, when the CP 413 determines that the potential burst satisfies all conditions mentioned in the step B-1 to B-4, the CP 413 then determines the potential burst to be the burst for estimating the web page download time.

Figure 13:
FIG. 13 is an exemplary flowchart illustrating a method of detecting burst(s) in an aggregated active second vector of a user device by the probe according to another exemplary embodiment.

FIG. 13 is an exemplary flowchart illustrating a method of detecting a burst in an aggregated active second vector of a user device by the probe according to another exemplary embodiment. The flowchart shown in FIG. 13 describes alternative procedures of the step A-4 in detail and includes the following steps C-1 to C-8.

At step C-1, the CP 413 performs determinations similar to step B-1. At step C-2, the CP 413 performs determinations similar to the step B-2. At step C-3, the CP 413 performs determinations similar to the step B-3. At step C-4, the CP 413 performs determinations similar to the step B-4.

At step C-5, the CP 413 determines whether the potential burst contains a number of bytes greater than or equal to a transferred byte lower threshold. For example, the transferred byte lower threshold may be 20 kilobytes (KB).

At step C-6, the CP 413 determines whether a percentage of active seconds in the aggregated active second vector in which the potential burst is identified is greater than or equal to a configured active second percentage threshold. For example, the configured active second percentage threshold may be 50%.

At step C-7, the CP 413 determines whether the active second corresponding to the time instant that the HTTP GET REQ message is received by the LP 411 falls within the first N active second in the potential burst. For example, the parameter N may be 3.

At step C-8, the CP 413 determines that the potential burst satisfies all conditions mentioned in the step C-1 to C-7, the CP 413 then determines the potential burst to be the burst for estimating the web page download time.

Before the CP 413 performs step B-1 or step C-1, the CP 413 may also determine whether the LP 411 receives a subsequent HTTP GET REQ message less than or equal to a configured browser timeout threshold value before the LP 411 receives corresponding HTTP GET Response message. For example, the configured browser timeout threshold value may be 5 seconds. Some of the HTTP GET REQ messages may be discarded or lost during the transmission of the corresponding IP packets and HTTP GET REQ messages are re-transmitted. When the CP 413 determines that, for a web session corresponding to a user device, the LP 411 receives the subsequent HTTP GET REQ message less than or equal to the configured browser timeout threshold value after the LP 411 receives the previous HTTP GET REQ message, but before the LP 411 receives a corresponding HTTP GET Response message, the CP 413 may determine to discard the previously received HTTP GET REQ message, and re-assign the burst comprising the subsequent HTTP GET REQ message as the first Burst, and also calculate the burst duration of the first burst starting with the subsequent HTTP GET Request message. Otherwise, when the CP 413 determines that, for a web session corresponding to a user device, the LP 411 receives the subsequent HTTP GET REQ message greater than the configured browser timeout threshold value after the LP 411 receives the previous HTTP GET REQ message, but before the LP 411 receives the corresponding HTTP GET Response message, then the CP 413 may determine to separate the previously received HTTP GET REQ message and the subsequent HTTP GET REQ message into two different web sessions.

The CP 413 supports a configuration file for "home pages" or a configured list of "home pages". For example, the CP 413 extracts host value and domain name from URL such as: "http://ww.xyz.com" or "http://www.xyz.com/abs.html" or "http://www.xyz.com:8080/contents/abc.html" as a string. Then, the CP 413 further extracts from the string "everything from after the double slash until the next slash or a colon or end of string". The CP 413 only calculates "home page download time" for the burst duration whose HTTP GET REQ message contains a home page value in the configured list of "home pages". If web page download time should be calculated, then CP will not exclude the burst duration for which the extracted value from the URI or the host value does not correspond to any entry in the configured list of "home pages".

Figure 14:
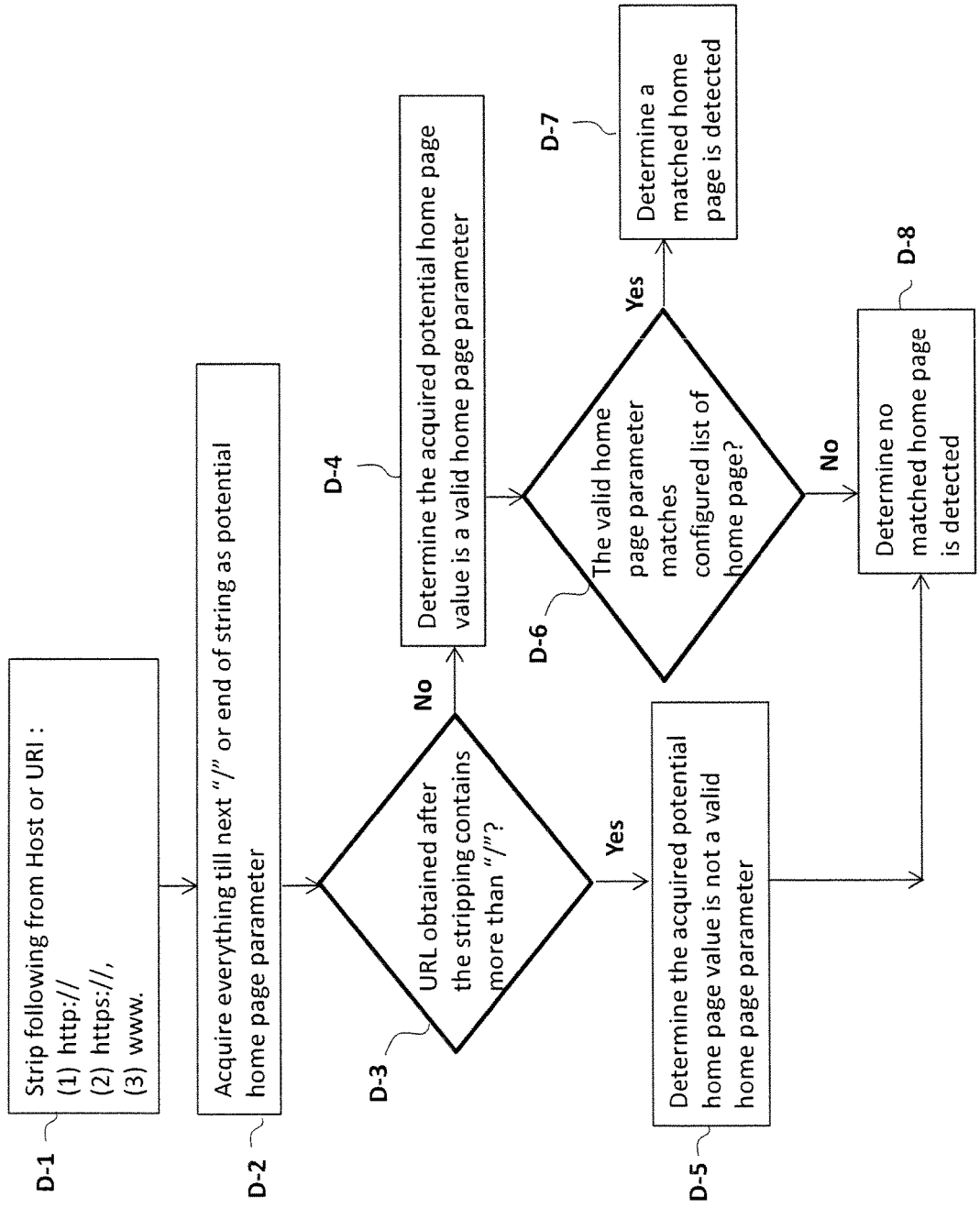
FIG. 14 is an exemplary flowchart illustrating a method of detecting a home page according to an exemplary embodiment.

FIG. 14 is an exemplary flowchart illustrating a method of detecting a home page according to an exemplary embodiment. FIG. 14 contains the following steps D-1 to D-8 and describes procedures of step A-6 in FIG. 11 in detail.

At step D-1, the CP 413 strips (1) "http://" or (2) "https://" or (3) "www." from Host of URI values obtained from the HTTP GET REQ message in the detected burst. At step D-2, the CP 413 acquires everything till a next "/" or a next ":" or a next colon or an end of string as a potential home page parameter.

At step D-3, the CP 413 determines whether the universal resource locator (URL), which is the acquired potential home page parameter, after the stripping performed in the step D-1 contains anything more than a single "/". When it is determined that the URL acquired after the stripping contains something else apart from the single "/", step D-5 is executed after the step D-3; otherwise, step D-4 is executed after the step D-3.

At step D-4, the CP 413 determines the acquired potential home page parameter to be a valid home page parameter. On the other hand, at step D-5, the CP 413 determines that the acquired potential home page parameter is not a valid home page parameter, and step D-8 is executed after the step D-5.

At step D-6, the CP 413 determines whether the valid home page parameter matches the configured list of home pages. When it is determined that the valid home page parameter matches an entry in the configured list of home pages, step D-7 is executed after the step D-6; otherwise, the step D-8 is executed.

At step D-7, the CP 413 determines a matched home page is detected, and then the CP 413 can output the estimated web page download time determined at the step A-5 as an estimated home page download time. On the other hand, at the step D-8, the CP determines that no matched home page is detected.

According to measurements in live wireless communication networks or live data communication networks, the proposed method for estimating web page download time or the method for estimating home page download time can accurately estimate "web page download time" or "home page download time", based on what the probe 100 can directly measure. Based on the "active second vector" approach, the proposed method implemented by the probe 100 can easily identify the re-transmission of HTTP GET REQ message and exclude the situation when more than one HTTP GET REQ message is transmitted but only one HTTP GET Response message is received from the corresponding web server. Also, by aggregating the active second vectors of active traffic flows corresponding to the same user device and grouping domain, the proposed method implemented by the probe 100 can more accurately estimate the "web page download time" or "home page download time", when there are multiple traffic flows involved to deliver the complete content of the web page.

Further aspects of the network monitoring probe 100 will be apparent from the above description of the network monitoring probe 100. Persons skilled in the art will also appreciate that any of the methods described above could be embodied in program code. The program code could be supplied in a number of ways, for example on a tangible computer readable medium, such as a disc or a memory or as a data signal.

It is to be understood that, if any prior art is referred to herein, such reference does not constitute an admission that the prior art forms a part of the common general knowledge in the art in any country. In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A method for estimating a web page download time on a web browser in a user device from a corresponding web server, comprising:
   receiving a plurality of active traffic flows by a network monitoring device, wherein the plurality of active traffic flows includes each of a unidirectional traffic flow, a bidirectional traffic flow, and an application traffic flow, wherein the bidirectional traffic flow corresponds to two directional traffic flows having opposite directions, and wherein the application traffic flow is an aggregation of multiple bidirectional traffic flows;

generating, by the network monitoring device, active traffic reports corresponding to the active traffic flows of the user device;

grouping, by the network monitoring device, domains corresponding to the active traffic flows according to a configured domain grouping file;

aggregating, by the network monitoring device, active second vectors in the active traffic reports according to the grouped domains, wherein the active second vector comprises a plurality of active seconds and idle seconds, wherein each active second is represented as binary value '1' and each idle second is represented as binary value '0', wherein each active second is determined based on detection of an IP packet carrying the Hypertext Transfer Protocol GET Request message at a predefined time interval;

generating at least one aggregated active second vector for the user device;

detecting, by the network monitoring device, at least one burst in the at least one aggregated active second vector and determining a start of the burst, an end of the burst, and the length of the burst according to the start and the end of the burst;

determining, by the network monitoring device, a potential burst satisfying a group of conditions including: 1) a number of active seconds of the burst in one of the at least one aggregated active second vectors is greater than or equal to a configured active second lower threshold, 2) a consecutive number of idle seconds before the start of the burst is greater than or equal to a configured preceding idle second threshold, 3) a consecutive number of idle seconds after the end of the burst is greater than or equal to a configured succeeding idle second threshold, 4) the burst contains a Hypertext Transfer Protocol GET Request message; and estimating, by the network monitoring device, a web page download time of the user device according to the potential burst in the at least one aggregated active second vector.

2. The method of claim 1, further comprising outputting, by the network monitoring device, the estimated web page download time to an external processing device.

3. The method of claim 1, further comprising detecting, by the network monitoring device, a home page in the burst for estimating the web page download time, according to a configured list of home pages.

4. The method of claim 3, wherein after detecting the home page in the burst for estimating the web page download time, the method further comprises estimating, by the network monitoring device, the download time of the home page.

5. The method of claim 4, further comprising outputting, by the network monitoring device, the estimated home page download time to an external processing device.

6. The method of claim 3, further comprising determining, by the network monitoring device, whether a Universal Resource Locator (URL), indicating acquired home page parameter, contains one or more additional characters apart from a character "/".

7. The method of claim 6 further comprising determining, by the network monitoring device, that the acquired home page parameter is not a valid home page parameter based upon determining that the URL contains at least one additional character apart from the character "/".

8. The method of claim 6 further comprising determining, by the network monitoring device, that the acquired home page parameter is a valid home page parameter based upon determining that the URL does not contain any additional character apart from the character "/".

9. A network monitoring device for estimating a web page download time on a web browser in a user device from a corresponding web server in a network, comprising:

at least one network interface connected to the network and configured to receive a plurality of active traffic flows, wherein the plurality of active traffic flows includes each of a unidirectional traffic flow, a bidirectional traffic flow, and an application traffic flow, wherein the bidirectional traffic flow corresponds to two directional traffic flows having opposite directions, and wherein the application traffic flow is an aggregation of multiple bidirectional traffic flows;

a link processor connected to the at least one network interface configured to generate active traffic reports corresponding to the active traffic flows of the user device;

a correlation processor connected to the link processor and configured to:

group domains corresponding to the active traffic flows according to a configured domain grouping file;

aggregate active second vectors in the active traffic reports according to the grouped domains, wherein the active second vector comprises a plurality of an active second and an idle second, wherein each active second is represented as binary value '1' and each idle second is represented as binary value '0', wherein each active second is determined based on detection of an IP packet carrying the Hypertext Transfer Protocol GET Request message at a predefined time interval;

generate at least one aggregated active second vector for the user device;

detect at least one burst in the at least one aggregated active second and determining a start of the burst, an end of the burst, and the length of the burst according to the start and the end of the burst;

determine a potential burst satisfying a group of conditions including: 1) a number of active seconds of the burst in one of the at least one aggregated active second vectors is greater than or equal to a configured active second lower threshold, 2) a consecutive number of idle seconds before the start of the burst is greater than or equal to a configured preceding idle second threshold, 3) a consecutive number of idle seconds after the end of the burst is greater than or equal to a configured succeeding idle second threshold, 4) the burst contains a Hypertext Transfer Protocol GET Request message; and estimate a web page download time of the user device according to the potential burst in the at least one aggregated active second vector.

10. The network monitoring device of claim 9, wherein the correlation processor is further configured to output the estimated web page download time.

* * * * *